G. GEBHART.
Bee Hive.
No. 2,967. Patented Feb. 20, 1843.
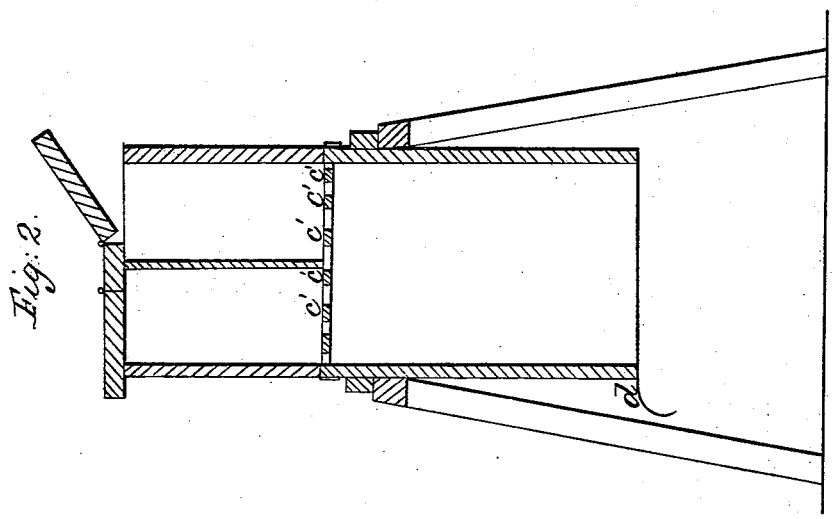
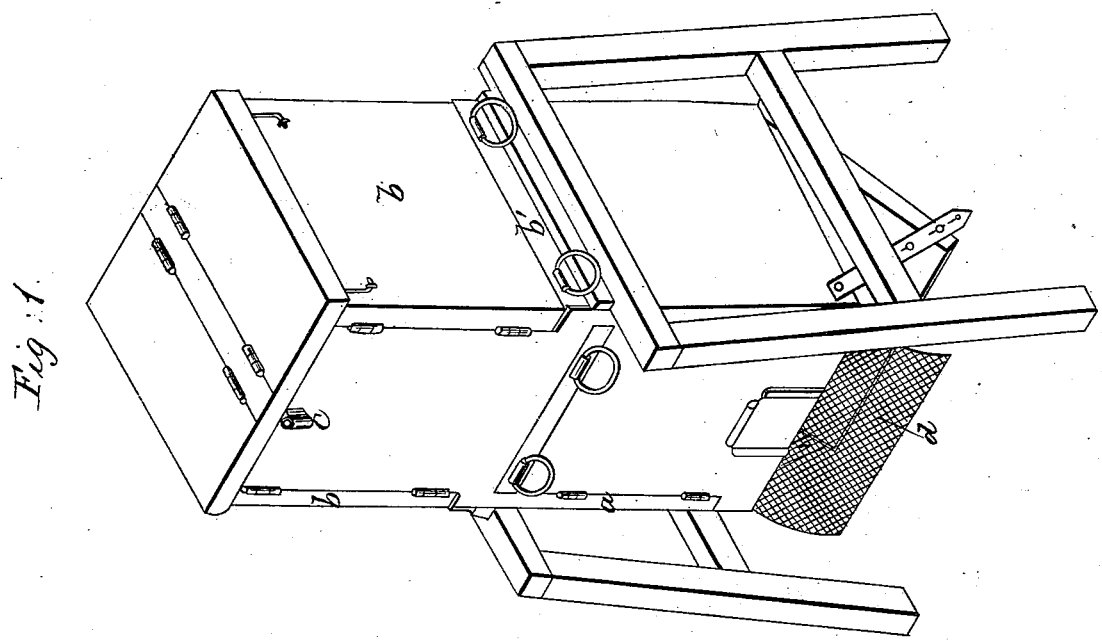

UNITED STATES PATENT OFFICE.

GEO. GEBHART, OF DAYTON, OHIO.

BEEHIVE.

Specification of Letters Patent No. 2,967, dated February 20, 1843.

*To all whom it may concern:*

Be it known that I, GEORGE GEBHART, of Dayton, in the county of Montgomery and State of Ohio, have invented a new and useful Improvement in Beehives; and I do hereby declare that the following is a full, clear, and exact description thereof, reference being had to the accompanying drawings, making a part of this specification, in which—

Figure 1, is an isometrical view; Fig. 2, a vertical section.

The nature of my invention consists in so constructing hives as to exclude the bee moth, keep the interior of the hive clean, and obtain at all times a supply of honey from the hive, without destroying, or disturbing the bees in their work.

The exterior of the hive is an oblong box, suspended on a suitable frame; the whole bottom of this box is removable and is only closed in cold weather; there is a door ($a$) on one side below the center, and also one on each side at the top (marked $b$). The top is formed of two doors, hinged to a strip in the center; from this strip a partition extends down about one third the height of the hive the same distance as the doors ($b$); there may be an opening in this partition at the top, that has a slide ($c$) to close it, if desired; a few sticks ($c'$) may be placed across at the bottom of this partition, to aid in supporting the comb below; but there is no partition floor across at this point; the whole bottom of the hive is covered with a wire cloth ($d$) which projects out in front, and curves down circularly; this keeps the whole interior of the hive clean, allowing all the fine refuse of the hive to fall through without requiring any labor on the part of the bees. At the back of the hive are inserted two glasses inserted in the common way and not shown in drawing, one near the top, the other lower down for convenience of examining the bees; these are closed by a tin slide, when not in use. Under the lower edge of the upper doors ($b$) there is an aperture the whole length, for the purpose of inserting a tin slide, to cut off the comb when desired; this aperture is stopped when the bees are at work by a slide ($b'$) just the thickness of the side board, and prevents its being stopped up by the bees, or admitting insects into the hive.

In taking honey from this hive a wire is inserted under the top cover, and the comb is cut clear from it; the cover is then raised sufficient to blow in smoke, so as to drive the bees out, into the other side, and bottom of the hive; the tin slide is then inserted under the door ($b$) and the bees shut out of the top on one side of the partition. The comb is then cut loose from the side door ($b$) which is opened without breaking the comb, which is then taken out whole; this can be done at any time of the day, when the bees are at work if desired. When the slide is withdrawn the bees will collect the honey spilled in the operation and commence building up from the comb below as well as from the top of the hive, thereby facilitating their operations, which would not be the case if there was a permanent partition, in place of the slide, having a hole through it. By taking the honey from one side it does not flow over the whole hive which is very injurious.

It is a well known fact that bees always fill the upper part of the hive with honey first, and if this is taken often enough, it leaves the lower part free for breeding; but when boxes, or drawers are used above, they will sometimes make honey below the partition; leaving too little room for breeding purposes. By my arrangement the bees breed faster, and swarm oftener.

The bottom of the hive being open and a wire cloth stretched across it, attracts the bee-moth to that part, where they cannot deposit their eggs; if they go toward the front, they run down the curved wire cloth above named, and as that carries them farther from the hive, they return again and in this manner exhaust themselves.

The lower door ($a$) is for the purpose of taking out the old comb in the lower part when it becomes necessary to do so.

Having thus fully described my improvement in beehives I wish it to be understood that I do not claim as my invention the ventilator under the bottom of the hive formed of wire cloth, but

What I do claim as my invention and desire to secure by Letters Patent is—

The projecting apron of wire cloth which curves down in front, serving for the bees to light on and preventing the beemoth which is attracted underneath from entering with the bees in the manner above set forth.

GEORGE GEBHART.

Witnesses:
JOHN D. ECKERT,
DAVID UHRICH.